United States Patent [19]

George

[11] Patent Number: 5,305,794
[45] Date of Patent: Apr. 26, 1994

[54] VALVE STRUCTURE

[75] Inventor: Gary George, Rocklin, Calif.

[73] Assignee: NEC Electronics Incorporated, Mountain View, Calif.

[21] Appl. No.: 31,064

[22] Filed: Mar. 12, 1993

Related U.S. Application Data

[63] Continuation of Ser. No. 823,572, Jan. 15, 1992, and a continuation of Ser. No. 580,389, Sep. 10, 1990.

[51] Int. Cl.$^5$ .............................................. F16K 15/18
[52] U.S. Cl. ................... 137/614.2; 137/513.7; 251/117
[58] Field of Search .......... 137/614.19, 614.2, 614.21, 137/513.7, 599, 68.1; 251/117; 222/3

[56] References Cited

U.S. PATENT DOCUMENTS

| | | | |
|---|---|---|---|
| 2,375,498 | 5/1945 | Seymour | 251/117 X |
| 2,731,298 | 1/1956 | Green | 222/402.16 X |
| 2,998,168 | 8/1961 | Waldherr | 222/402.16 X |
| 3,060,965 | 10/1962 | Taggart | 222/402.16 X |
| 3,645,286 | 2/1972 | Follett | 137/68.1 |
| 3,930,517 | 1/1976 | Gagala | 137/614.2 X |
| 4,444,230 | 4/1984 | Van Mullem | 137/614.2 X |
| 4,635,680 | 1/1987 | Fang | 137/614.2 X |

FOREIGN PATENT DOCUMENTS

| | | | |
|---|---|---|---|
| 557536 | 5/1957 | Belgium | 137/614.2 |
| 2407104 | 8/1975 | Fed. Rep. of Germany | 137/614.2 |
| 992375 | 10/1951 | France | 251/117 |
| 242238 | 2/1926 | United Kingdom | 222/3 |

OTHER PUBLICATIONS

Matheson, "Guide to Safe Handling Of Compressed Gases", third printing, p. 39, 1983.

*Primary Examiner*—John C. Fox
*Attorney, Agent, or Firm*—Skjerven, Morrill, MacPherson, Franklin & Friel

[57] ABSTRACT

A gas cylinder valve assembly has an outside portion positioned outside the gas cylinder and an inside portion positioned inside the gas cylinder. A canal for conducting gas passes through the inside and outside portions. The canal communicates with the inside of the cylinder through orifices in the inside portion. The canal further communicates with the inside of the gas cylinder through an opening, gas flow through which is controlled by a check valve. The check valve normally closes the opening. Gas in the cylinder flows to the outside through the orifices. During the filling operation, gas is supplied from outside under pressure. The gas under pressure opens the check valve, and gas flows both through the orifices and through the opening.

12 Claims, 4 Drawing Sheets

VALVE STRUCTURE

This application is a continuation of application Ser. No. 07/823,572, filed Jan. 15, 1992 and a continuation of application Ser. No. 07/580,389, filed Sep. 10, 1990.

BACKGROUND OF THE INVENTION

1. Field of the Invention

This invention relates to valve structures, and more particularly to valve structures for use with storage devices for pressurized gases or liquids.

2. Description of Related Art

Valve assemblies are used with storage devices for storing gas or liquid under pressure. Valve assemblies regulate the flow of gas or liquid in and out of the storage device. Many valve assemblies have safety features that minimize risk to the valve assembly operator in case of damage to the assembly. FIGS. 1 and 2 show a gas cylinder 10 and a prior art valve assembly 40. Gas cylinder 10 normally stores gas under pressure. Valve assembly 40 has a canal 70 for releasing gas from cylinder 10 and for filling cylinder 10. Canal 70 is opened and closed by an angle globe valve 64. An operator operates valve 64 by turning handwheel 62.

Nozzle 50 of valve assembly 40 has protrusion 54 which defines a relatively narrow orifice 56 limiting the flow area through canal 70. Even if valve 64 is fully open, orifice 56 restricts the gas flow and thus makes the valve assembly operation safer for the operator.

Valve assembly 40 has certain shortcomings. If the relatively narrow orifice 56 gets plugged, gas cannot be released from gas cylinder 10. Furthermore, gas cylinder 10 is purged before being replaced. If orifice 56 is plugged, gas gets trapped inside cylinder 10. The trapped gas makes gas cylinder changing dangerous.

To refill gas cylinder 10, valve 64 is opened and gas is supplied under pressure from outside through canal 70. Orifice 56 restricts the gas flow and so makes filling several times longer.

Also, if valve assembly 40 is accidentally sheared off cylinder 10, the gas is released from cylinder 10 at a high rate thus placing the operator at risk.

It is desirable to provide a safe and fully functional valve assembly without the foregoing shortcomings.

SUMMARY OF THE INVENTION

When used with storage devices such as gas cylinders, the valve assembly of my invention functions by allowing fast filling of the storage device while providing for a limited discharge of gas during normal operation. The valve assembly reduces the chances of having gas trapped during purging. The valve assembly safety features reduce the risk to the operator in case when the portion of the assembly outside the cylinder is sheared off.

According to this invention, a valve assembly has a body adapted for being mounted in a wall of a vessel. The body has a first portion to be positioned inside a vessel and a second portion to be positioned outside the vessel and above the first portion. A canal extends through the first and second portions. The canal has an opening in the first portion and a part above the opening. That part communicates with an inside of the vessel through one or more orifices. The assembly further has a check valve seated against the opening. The check valve opens the opening when a matter like gas goes down through the canal under a predetermined pressure.

According to another aspect of the present invention, a valve assembly has a canal therethrough, the canal has a first end and a second end. An orifice passes from the canal outside the assembly. The orifice has an opening into the canal between the first and second ends. A check valve restricts the flow of matter through the second end towards the first end. The check valve allows the free flow of matter from the first end through the second end when the matter is supplied under a predetermined pressure.

According to another aspect of the present invention, an apparatus is provided for conducting a matter between a first region and a second region, the first region having a first pressure and the second region having a second pressure. The apparatus has a body having a first path therethrough for conducting a matter between the two regions, and a second path therethrough for conducting a matter between the two regions. The apparatus further has a check valve in the second path. The check valve opens the second path only when the second pressure exceeds the first pressure by a predetermined amount.

According to another aspect of the present invention, a valve assembly comprises a body member adapted to be mounted in a wall of a vessel with a first body portion inside of the vessel and the second body portion outside the vessel. A first canal extends from an orifice on the exterior of the second body portion through the body member to a terminus. A second canal extends from an orifice on the exterior of the first body portion to the first canal. The smallest cross sectional area of the second canal is less than the smallest cross sectional area of the first canal. A check valve is provided having an inlet communicating with the terminus of the first canal and an outlet.

DESCRIPTION OF THE PREFERRED EMBODIMENT

Figure 1:
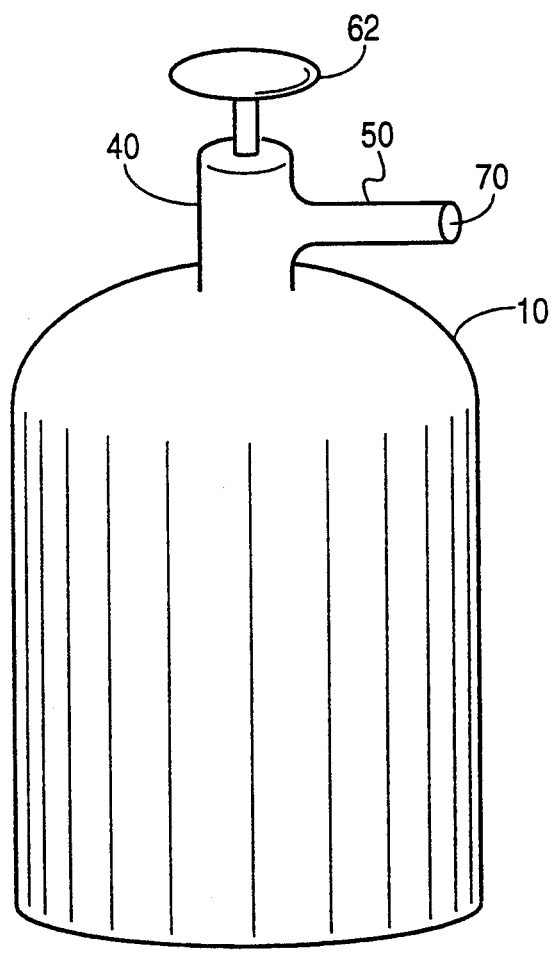
FIG. 1 shows a perspective view of a gas cylinder with a prior art valve structure.
Figure 2:
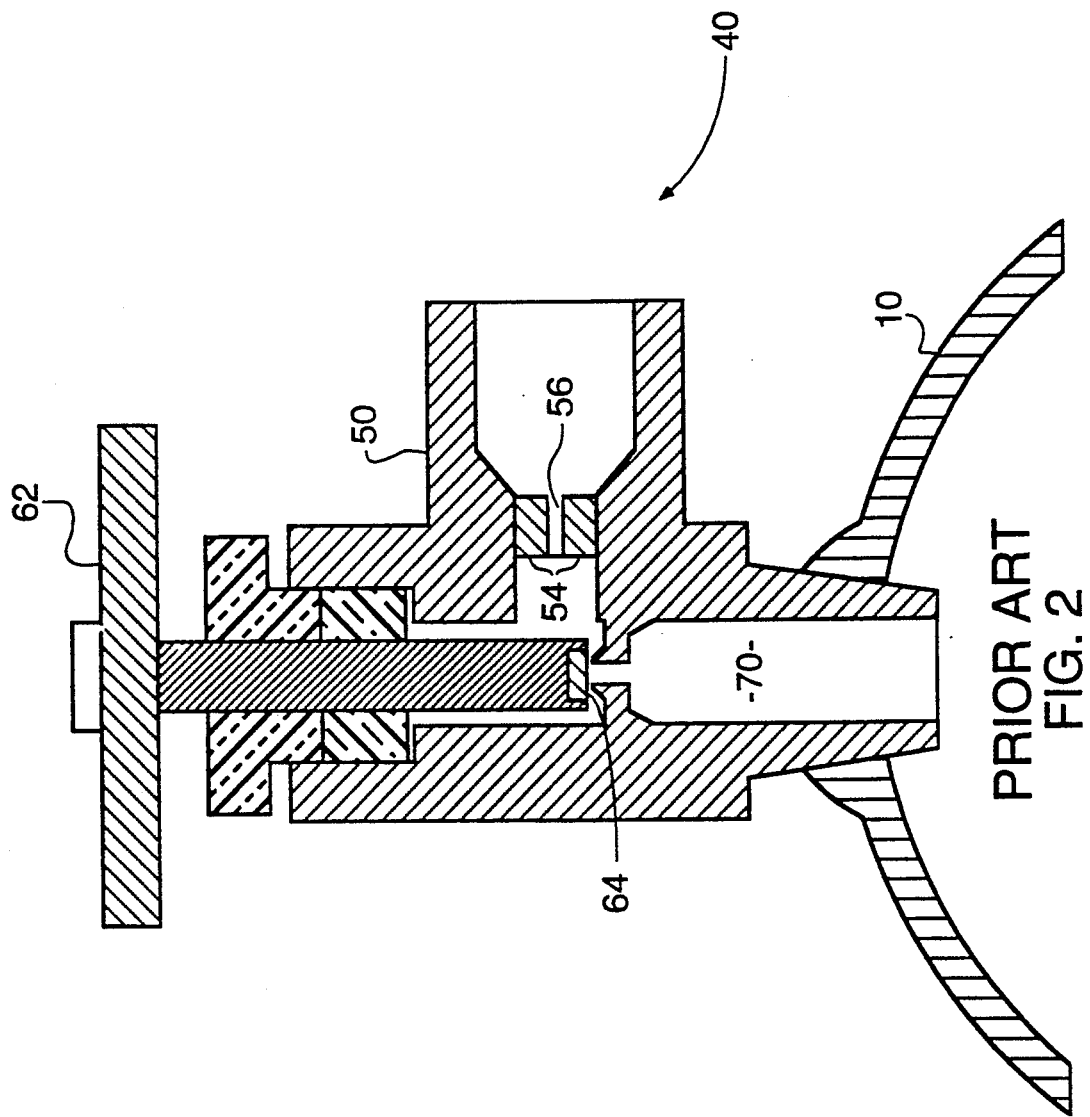
FIG. 2 shows a longitudinal cross-section of a prior art valve structure.
Figure 3:
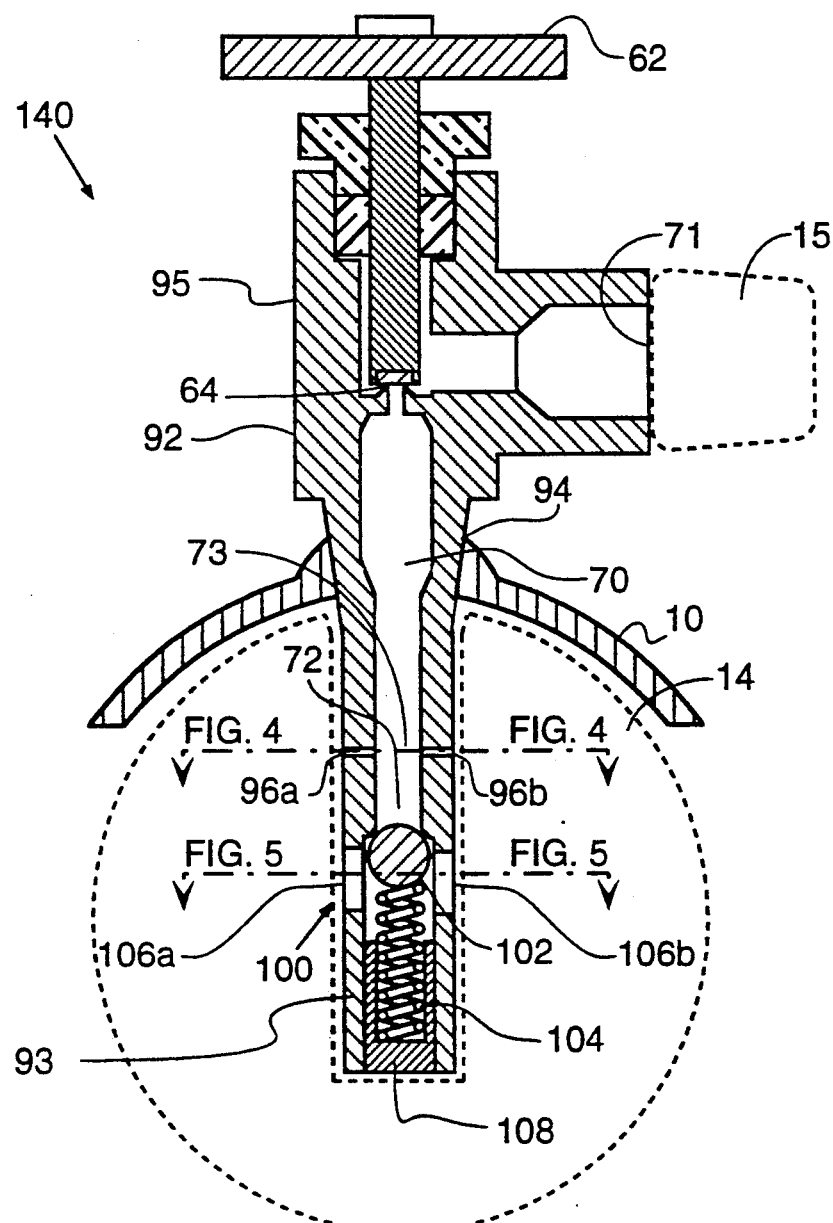
FIG. 3 shows a longitudinal cross-section of a valve structure according to the present invention.

FIG. 3 shows a valve assembly 140 suitable for use with a vessel or gas cylinder 10 for storing gas or liquid under pressure.

Valve assembly 140 includes a body 92 which has outside threads 94 formed between a first body portion 93 and a second body portion 95. Valve assembly 140 is mounted to gas cylinder 10 by means of threads 94 which mate with similar threads on gas cylinder 10. When valve assembly 140 is connected to gas cylinder 10, first body portion 93 is located inside of gas cylinder 10 and second body portion 95 is located outside of gas cylinder 10.

A first canal 70 extends through body 92 from a first opening 71 located at a first end of second body portion 95 to a second opening (terminus) 72 located at a second end of first body portion 93. First canal 70 provides a gas flow passage between an inside (first) region 14 located inside of cylinder 10 and outside of body 92, and an outside (second) region 15 located outside of cylinder 10 and body 92. First canal 70 communicates with, but is distinguished from, inside region 14 and outside region 15.

Figure 4:
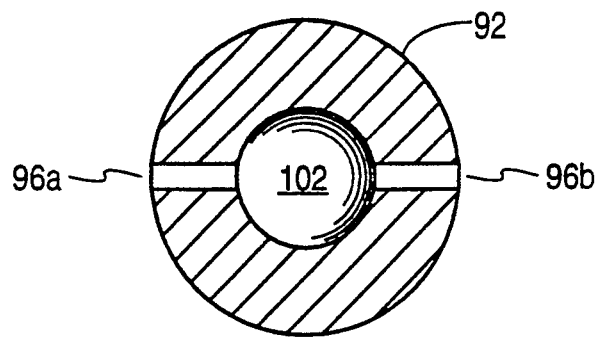
FIG. 4 shows a transversal cross-section of the valve structure of FIG. 3 along the lines FIG. 4—FIG. 4 of FIG. 3.

Orifices 96a and 96b are formed in a wall of first body portion 93 which provides permanently-open second canals directly between inside region 14 of gas cylinder 10 and a part 73 of canal 70. FIG. 4 shows a top view of the cross-section taken along lines FIG. 4—FIG. 4 through orifices 96a and 96b. The second canals formed by orifices 96a and 96b have cross sectional areas which a smaller than a cross sectional area of first canal 70.

A valve 64 is located in second body portion 95 and disposed to adjustably block gas flow along first canal 70. If the gas pressure of inside region 14 is greater than the gas pressure of outside region 15 and valve 64 is opened, then gas flows along a first path from inside region 14 of gas cylinder 10 through orifices 96a and 96b, through first canal 70, past open valve 64, and out first opening 71 to outside region 15. Note that the second canals defined by orifices 96a and 96b provide a direct passage between inside region 14 and part 73 of first canal 70 when valve 64 is in either an open position or a closed (flow blocking) position. Therefore, if second body portion 95 and valve 64 are broken or sheared from first body portion 93, then orifices 96a and 96b allow a restricted flow of gas to exit cylinder 10. Because the rate of gas flow is restricted when valve 64 is sheared off, the risk of injury to the operator is reduced. Further, because the gas is able to escape through orifices 96a and 96b, gas is not trapped in gas cylinder 10.

Figure 5:
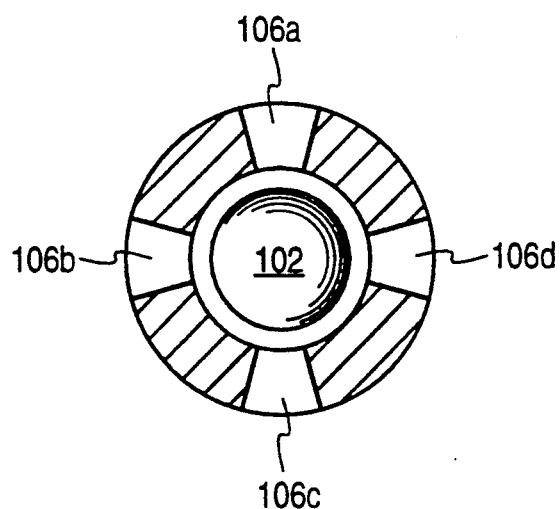
FIG. 5 shows a transversal cross-section of the valve structure of FIG. 3 along the lines FIG. 5—FIG. 5 of FIG. 3.

Valve assembly 140 further includes a spring-assisted ball seated check valve 100 for adjustably blocking gas flow between first canal 70 and inside region 14 through second opening 72. Check valve 100 comprising a ball 102 and a spring 104. Spring 104 is mounted in a cup 108. Cup 108 includes exterior threads which mate with similar threads formed in body 92. A top view of check valve 100 along line FIG. 5—FIG. 5 of FIG. 3 is shown in FIG. 5. Preset loading on spring 104 forces ball 102 upward to close second opening 72 of canal 70. Preset loading in the range rom 15 lbs to 100 lbs is suitable.

During a refill operation, valve 64 is opened and gas pressure of the outside region 15 is made greater than the gas pressure of inside region 14 of gas cylinder 10. This causes gas to flow along the first path from outside region 15 through first opening 71, through open valve 64 and through orifices 96a and 96b into inside region 14 of gas cylinder 10. Note that gas flow into inside region 14 is restricted by orifices 96a and 96b. In addition to flow along the first path, gas pressure creates a force on check valve 100 which forces ball 102 to compress spring 104, thereby forcing ball 102 away from second opening 72. This creates a second gas flow path from outside region 15 through first opening 71, through open valve 64 and through second opening 72 and large openings 106a through 106d into inside region 14 of gas cylinder 10. Note that the first and second flow paths include a common portion from first opening 71 to the part 73 of first canal 70 adjacent orifices 96a and 96b. During the refill operation, most of the gas flows along the second path because second opening 72 and large openings 106a through 106d, which are formed on body 92, are substantially larger than orifices 96a and 96b.

Therefore, less gas flow restriction occurs along the second path than along the first path, thereby facilitating fast refill operations.

Valve assembly 140 thus allows fast refill operation while orifices 96a and 96b provide the safety feature of restricting the outflow of gas from inside region 14 if second body portion 95 is sheared off from cylinder 10. Because valve 64 blocks a portion of first canal 70 between first opening 71 and orifices 96a and 96b, orifices 96a and 96b are not easily plugged b external dirt. Furthermore, if one orifice 96a and 96b is plugged, gas flows through the other. In particular, gas is unlikely to be trapped in gas cylinder 10 during purging. Thus gas cylinder replacement is safer.

While my invention has been described in terms of the embodiments and variations set forth above, it is not to be considered limited to these embodiments and variations. For example, more than two orifices may be provided; only one orifice is sufficient. Orifices 96 do not have to extend horizontally, and may have other shapes and directions. Check valve 100 may have other constructions than the spring-assisted ball seated valve described above. Valve 64 may be implemented in many ways. Opening 106 may be of many shapes and configurations. Valve assembly 140 can be used with gas tanks and other vessels differing from gas cylinder 10 in numerous ways. Valve assembly 140 can regulate the flow of liquid rather than gas, or of gas which is liquified under pressure inside the vessel. The scope of my invention is defined by the following claims.

What is claimed is:

1. A valve assembly for controlling a flow of matter between a first region located inside of a vessel and a second region located outside of the vessel, said valve assembly comprising:

a body adapted for being mounted in a wall of the vessel with a first body portion inside the vessel and a second body portion outside the vessel, said body having a first opening formed in the second body portion and a second opening formed in the first body portion;

a canal extending through said first and second body portions rom said first opening to said second opening, said canal being distinguished from said first region and said second region, said canal having a part adjacent said second opening, said part continually communicating with said first region through one or more orifices formed on said first body portion;

a valve disposed in said canal between said second region and said orifices; and a check valve comprising:
   first means removably seated against said second opening and adapted to open said second opening to provide flow between asid canal and said first region when a matter is supplied trough said canal under a predetermined pressure; and
   means for impelling said first means to close said opening;

wherein if the valve is separated from said body when a gas pressure in the first region is greater than a gas pressure in the second region, said first means is biased to seat against said second opening by said means for impelling, and gas is released from said first region to said second region through said orifices.

2. The valve assembly of claim 1, wherein said orifices are more than one in number.

3. The valve assembly of claim 1, wherein said canal is adapted to communicate with the inside first region of said vessel uniquely trough said valve, said orifices and said first and second openings; and wherein a flow area through said canal is larger than a flow area through said orifices such that restriction of gas flow through said orifice is greater than through said canal between said first and second openings when said first means is separated from said second opening.

4. A valve assembly for controlling a flow of matter between a first region located inside of a vessel and a second region located outside of said vessel, said valve assembly comprising:

a body having a canal therethrough, means for connecting said body to said vessel such that a first opening of the canal is disposed outside of the vessel and a second opening of the canal is disposed inside of the vessel, said canal providing a passage between said first opening and said second opening such that gas can flow along said canal rom said first region to said second region, said canal being distinguished from said first and second regions, a valve disposed in said canal adjacent said first opening for adjustably blocking a flow of gas in said canal, said body defining a permanently open orifice disposed adjacent said second opening, said orifice providing a continually open direct passage between the first region and the canal, said assembly further comprising a check valve comprising means for biasing said check valve so as to restrict a flow of matter through said second opening towards said first opening, said check valve allowing a flow of matter from said first opening through said second opening when said matter is supplied under a predetermined pressure;

wherein if the valve is separated from said body when a gas pressure in the first region is greater than a gas pressure in the second region, said check valve is biased to restrict gas flow from the first region into the canal through the second opening, and gas is released from said first region to said second region through said orifice.

5. The valve assembly of claim 4, wherein:

said canal is bent by about 90° at about a location of said valve;

said check valve is a spring-assisted ball seated check valve; and said valve is an angle globe valve.

6. A valve assembly for controlling a flow of matter between a first region located inside of a vessel and a second region located outside of said vessel, said valve assembly comprising:

a body member adapted to be mounted in a wall of a vessel with a first body portion thereof inside the vessel and a second body portion thereof outside the vessel;

a first canal extending through the body member form the exterior of said second body portion through said body member to a terminus such that said first canal provides a flow passage between said first region and said second region, said first canal being distinguished from said first and second regions;

a valve disposed in said second body portion;

an orifice formed on said first body portion for providing a continually open second canal directly between said first region and said first canal, the smallest cross sectional area of said second canal being less than the smallest cross sectional area of said first canal; and a check valve having an inlet communicating with the terminus of said first canal and having an outlet communicating with the first region, said check valve comprising means for biasing said check valve to a closed position;

wherein, if said second body portion is sheared off when said body member is mounted in said wall of said vessel, said first and second canals provide an open path between the first region and the second region.

7. The valve assembly of claim 6, wherein said check valve comprises a ball removably seated against the terminus of said first canal; and wherein said biasing means comprises a spring biasing the ball against the terminus.

8. The valve assembly of claim 7, wherein said ball and said spring are mounted in a cavity of said body member, said cavity forming the outlet of said check valve.

9. The valve assembly of claim 6, wherein said first canal is a vertical channel; and said second canal is a transverse bore relative to said first canal.

10. A valve assembly for controlling a flow of matter between a first region located inside of a gas storage vessel and a second region located outside of said vessel, said valve assembly, comprising:

a body having a canal extending from a first opening and a second opening, said first opening being formed on a second body portion located outside said vessel and said second opening being formed on a first body portion located inside said vessel when said valve assembly is mounted on said vessel, said canal being distinguished from said first region and said second region;

a check valve closing said canal at a portion of said canal and such that, when said body is mounted on said vessel, said check valve opens a passage between said canal and said first region only when said vessel is being filled by gas supplied through said first opening at a pressure sufficient to open said check valve;

a valve disposed in said canal between said first opening and said check valve; and one or more permanently open orifices in said body disposed between said valve and said check valve and providing a continually open direct passage connecting the first region with a part of said canal, said part being situated between said first opening and said portion of said canal including said check valve;

wherein said check valve and said portion of said canal are situated inside said vessel wherein said valve assembly is mounted on said vessel; and wherein if said valve assembly is mounted on said vessel and the portion of the assembly outside the vessel is sheared off while said vessel contains gas, the gas is released from said first region through said orifices and said canal as long as gas pressure in the first region is higher than gas pressure in the second region.

11. The valve assembly of claim 10 wherein the number of said orifices is greater than one.

12. The valve assembly of claim 10 wherein said check valve is a spring-assisted valve.

* * * * *